Patented Sept. 3, 1940

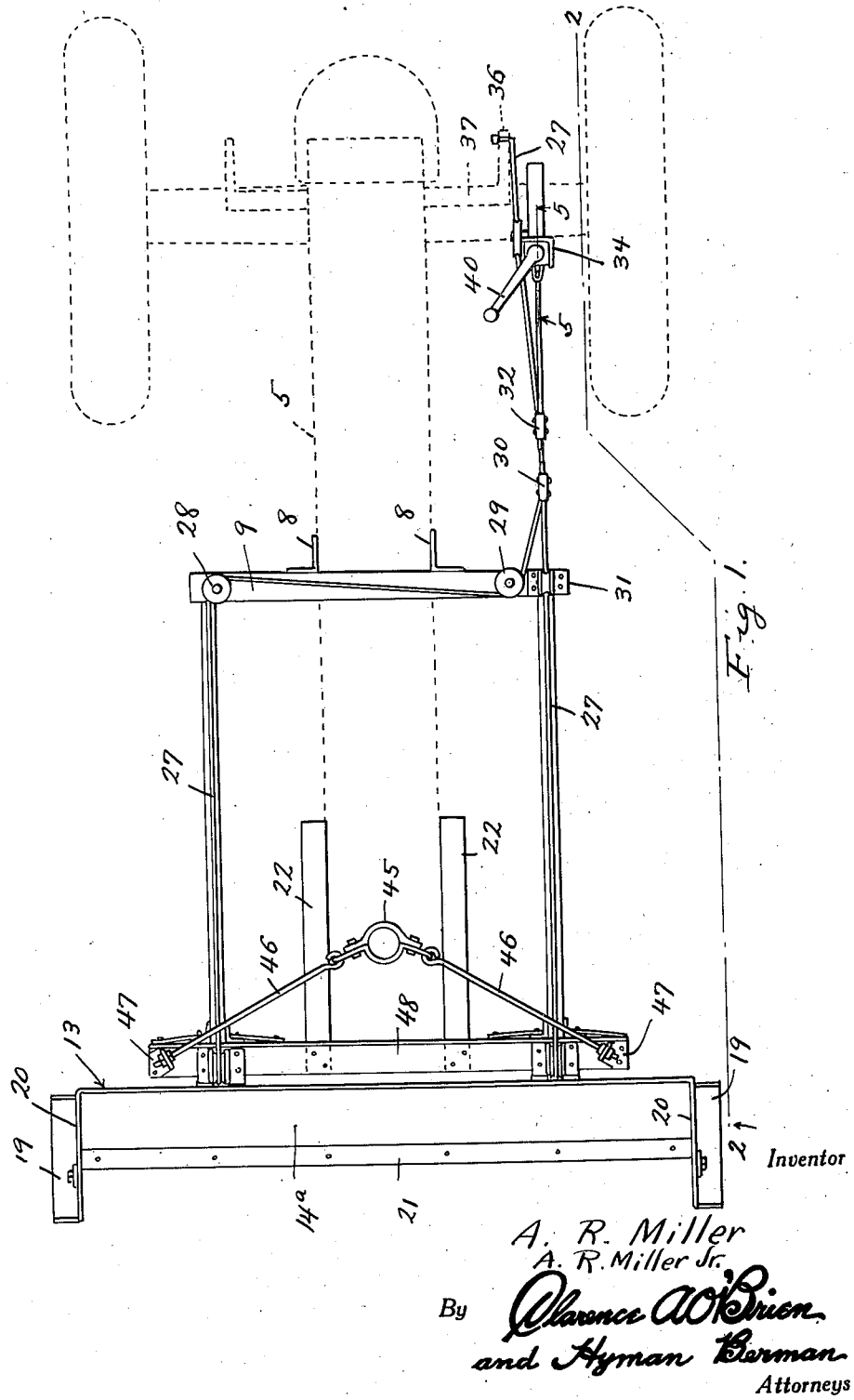

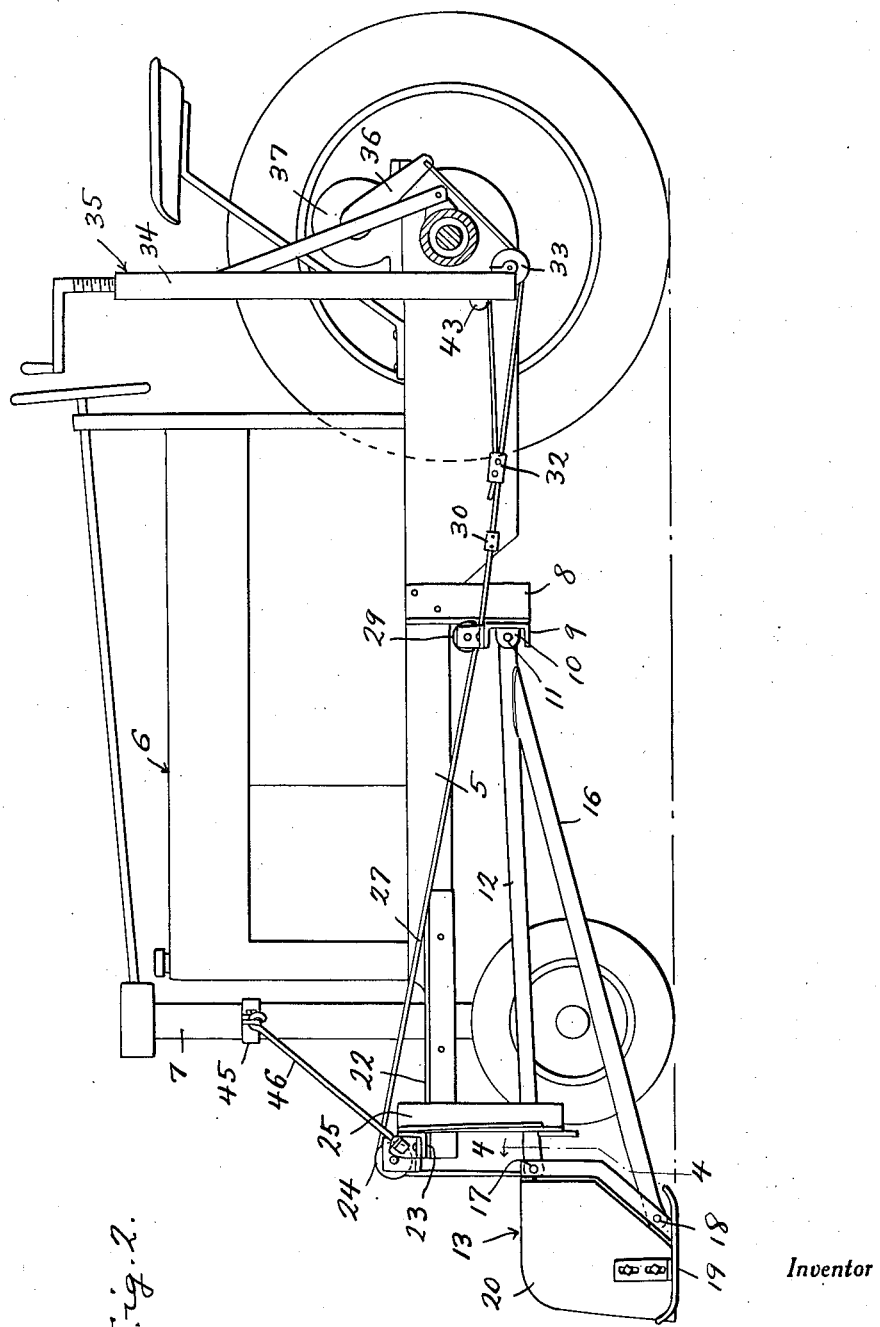

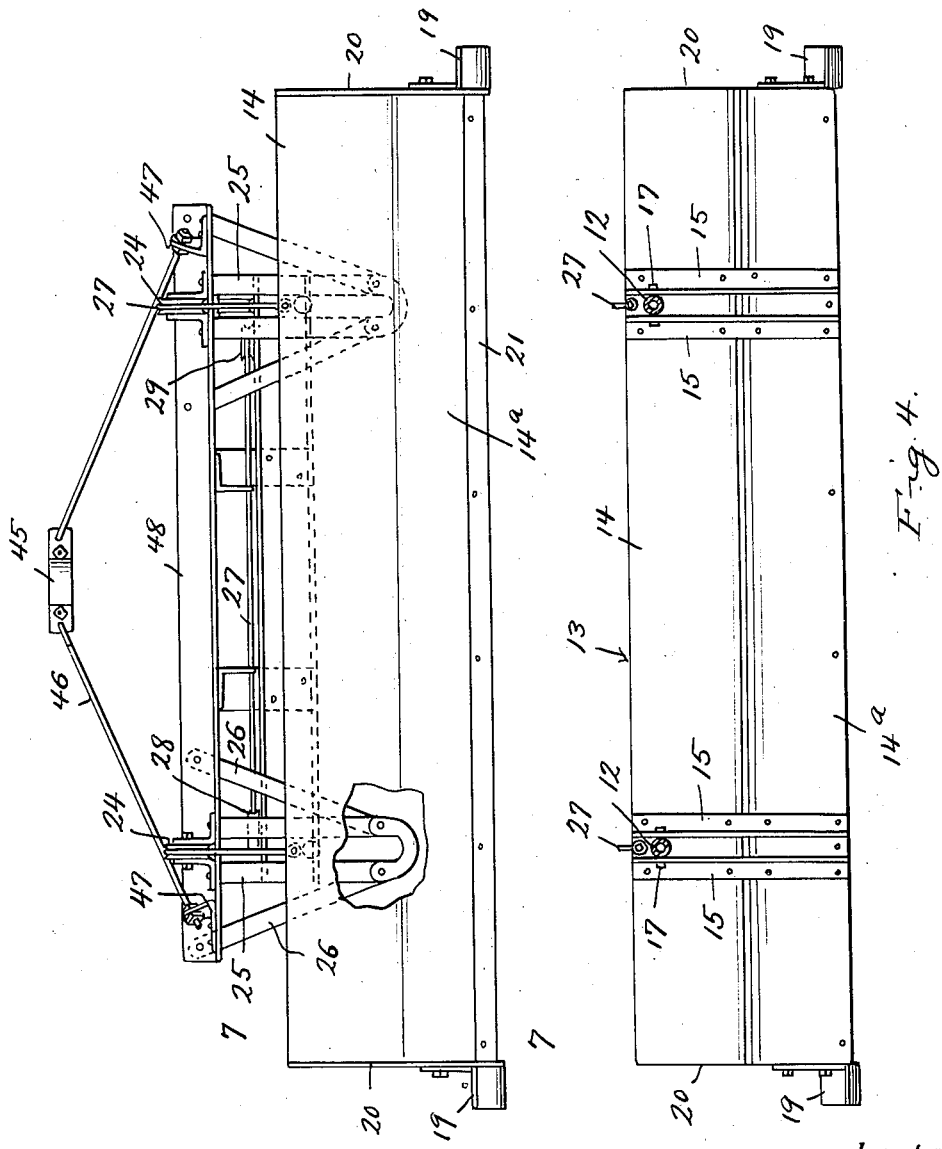

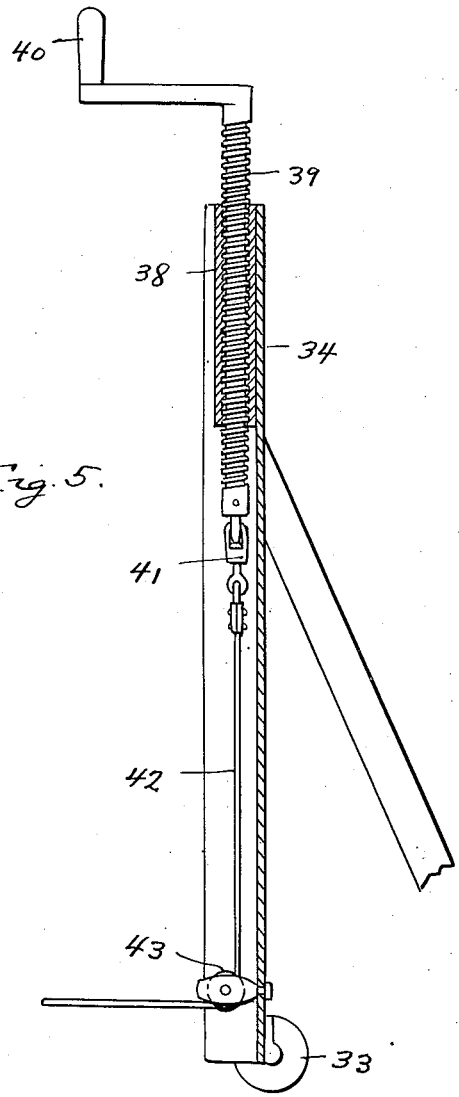
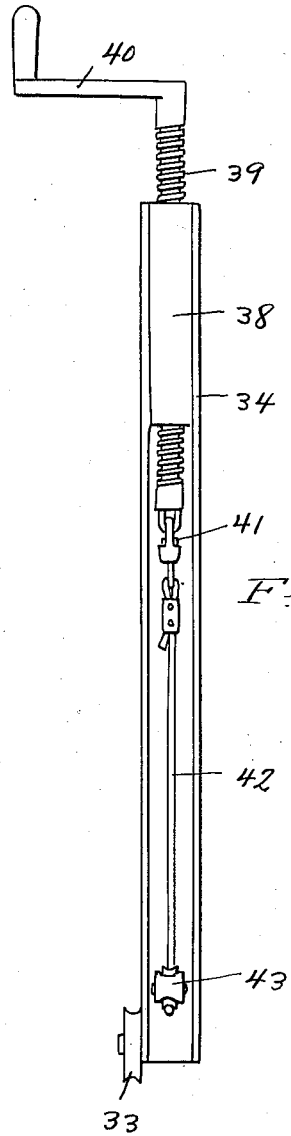
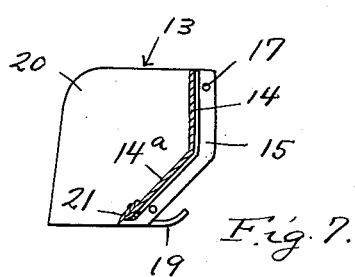

2,213,635

UNITED STATES PATENT OFFICE 2,213,635

SCRAPER ATTACHMENT

Avery R. Miller and Avery R. Miller, Jr., Fabens, Tex.

Application April 25, 1939, Serial No. 269,968

3 Claims. (Cl. 37—153)

This invention relates to new and useful improvements in scraper attachments for tractors.

The principal object of the present invention is to provide a scraper attachment, especially for use on farm tractors for the purpose of leveling, building ditches, borders and other earth construction.

Another important object of the invention is to provide a device of the character stated which can be readily applied to a tractor and which in use will be positive acting and not susceptible to the ready development of defects.

These and other objects and advantages of the invention will become apparent to the reader of the following specification.

In the drawings:

Figure 1 represents a top plan view of the attachment.

Figure 2 is a side elevational view of the attachment applied to a tractor.

Figure 3 is a front elevational view of the attachment.

Figure 4 is a sectional view taken substantially on the line 4—4 of Figure 2.

Figure 5 is a sectional view taken substantially on the line 5—5 of Figure 1.

Figure 6 is a front elevational view of the adjusting screw means.

Figure 7 is a section on the line 7—7 of Figure 3.

Referring to the drawings wherein like numerals designate like parts, it can be seen in Figure 2 that numeral 5 represents the chassis of the tractor generally referred to by numeral 6, this tractor being of conventional design, the same having the steering shaft housing 7 vertically disposed at the front end of the tractor.

A pair of angle iron members 8 are secured at their upper ends to the chassis frame 5 and bridging the lower ends of these angle members 8 is the channelled horizontally disposed bar 9 having ears formed therein as at 10, and to these ears are pivotally secured as at 11 the carrier arms 12 for the scraper unit generally referred to by numeral 13.

This scraper unit 13 consists in construction of the back wall 14 to which are secured the vertically disposed angularly bent angle members 15 arranged in closely spaced pairs and between which the forward ends of the arms 12 and brace members 16 are disposed and pivotally secured in place as at 17 and 18, respectively.

Vertically adjustable runners 19 are provided on the outer sides of the end walls 20 of the scraper unit, and as is shown in Figure 1, the bottom portion or inclined portion of the back 14, denoted by the reference character 14a, has the detachable scraper blade 21 attached thereto.

Bar members 22 extend forwardly from the chassis frame 5 and at their forward ends are bridged by the angle member 23 on which pulleys 24 are mounted. Depending from the forward ends of the bars 22 are the downwardly disposed yokes 25 which act as guides for the carrier arms 12, these yokes 25 being provided with laterally disposed brace bars 26.

A cable 27 extends from each end portion of the back wall 14 upwardly and over the corresponding pulley 24 and rearwardly to the channeled member 9. As can be seen in Figure 1, the right end of the channeled member 9 has a horizontally disposed pulley 28 mounted thereon, and around this is disposed the right cable 27. The last-mentioned cable 27 is then disposed longitudinally of the channeled member 9 to the other horizontally disposed pulley 29 and from there extends to be clamped as at 30 to the left cable 27 which is disposed under the vertically set pulley 31 mounted on the channeled bar 9.

The left cable extends rearwardly through the clamp 32 and under the pulley 33 mounted on the lower end of the channeled post 34 of the manual adjusting means generally referred to by numeral 35, and from there to connect to the arm 36 of the hydraulic lift means generally referred to by numeral 37.

Properly secured in the upper portion of the channeled post 34 is the elongated block 38 formed with a threaded bore to accommodate the screw shaft 39 which has the crank handle 40 at its upper end.

The lower end of the screw shaft 39 is connected by the swivelled connection 41 to the branch cable 42 which extends downwardly and under the pulley 43 mounted in the lower portion of the channeled member 34 and then forwardly to be secured to the left cable 27 by the clamp 32 (see Figure 2).

Obviously, adjustment of the screw 39 will regulate the cables 27 and correspondingly the scraper unit 13 so that disposition of the scraper unit in response to the hydraulic lift 37 can be gauged.

Brace means is provided at the forward end of the tractor, the same consisting of a split clamp collar 45 clamped to the steering shaft housing 7 and from this extends the tie rods 46—46 to pass through ears 47 on the ends of the angle bar 48.

It can be seen, that the hydraulic or power lift 37 operates the arm 36, which acts on the cable 27 to lift the scraper unit when lifting action of the unit is desired. The purpose of the adjusting means generally referred to by numeral 35 is to regulate the extent of movement of the cable 27 when the cable is moving in a direction dropping the scraper unit 13. In other words, the adjusting means 35 includes the branch cable 42 attached to the intermediate portion of the cable 27 and acts as a stop to hold the blade at the desired position with respect to the ground. Obviously, minute adjustment of the blade can be made through the agency of the adjusting means 35. The lift 37 actually performs the lifting work, while the adjusting means 35 which is connected by the cable 42 to the cable 27 simply serves as a limiting means, determining the extent of cut the blade is to take.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In combination a tractor including an operators seat, a ground engaging blade, a power lift including an operating arm, a cable extending from the blade to the arm, an adjusting member, and a cable connection between the adjusting member and the first mentioned cable at an intermediate point thereof, said adjusting member being located adjacent the driver's seat and being adapted to regulate the extent of movement of the first mentioned cable when moving in blade-dropping direction, said adjusting member consisting of an internally threaded vertically disposed barrel, a threaded shaft disposed through the barrel and having a crank handle at its upper end, said second mentioned cable being attached to the lower end of the threaded shaft.

2. In combination a tractor including an operator's seat, a ground engaging blade, a power lift including an operating arm, a cable extending from the blade to the arm, an adjusting member, and a cable connection between the adjusting member and the first mentioned cable at an intermediate point thereof, said adjusting member being located adjacent the driver's seat and being adapted to regulate the extent of movement of the first mentioned cable when moving in blade-dropping direction, said adjusting member consisting of an internally threaded vertically disposed barrel, a threaded shaft disposed through the barrel and having a crank handle at its upper end, said second mentioned cable being attached to the lower end of the threaded shaft and a swivelled connection between the second mentioned cable and the threaded shaft.

3. In combination a tractor including an operator's seat, a ground engaging blade, a power lift including an operating arm, a cable extending from the blade to the arm, an adjusting member, and a cable connection between the adjusting member and the first mentioned cable at an intermediate point thereof, said adjusting member being located adjacent the driver's seat and being adapted to regulate the extent of movement of the first mentioned cable when moving in blade-dropping direction, said adjusting member consisting of a vertically disposed channeled post, an internally threaded barrel fixed on the upper portion of the post, a threaded shaft disposed in the barrel and provided with a crank handle at its upper end, said second mentioned cable being attached to the lower end of the threaded shaft and partly operating in the said channeled post.

AVERY R. MILLER.
AVERY R. MILLER, Jr.